United States Patent [19]

Muggli

[11] 4,008,448
[45] Feb. 15, 1977

[54] SOLENOID WITH SELECTIVELY ARRESTIBLE PLUNGER MOVEMENT
[75] Inventor: Juerg Muggli, Woburn, Mass.
[73] Assignee: Polaroid Corporation, Cambridge, Mass.
[22] Filed: Oct. 3, 1975
[21] Appl. No.: 619,361
[52] U.S. Cl. .............................. 335/258; 335/262
[51] Int. Cl.² .......................................... H01F 7/13
[58] Field of Search .......... 335/258, 262, 255, 261, 335/279; 354/235, 255

[56] References Cited
UNITED STATES PATENTS

| 1,293,052 | 2/1919 | Dinsmoor | 335/262 |
| 3,035,139 | 5/1962 | Lindsay | 335/261 |
| 3,396,354 | 8/1968 | Fisher | 335/262 |
| 3,805,204 | 4/1974 | Petersen | 335/258 |

Primary Examiner—Harold Broome
Attorney, Agent, or Firm—Edward S. Roman

[57] ABSTRACT

A solenoid comprising an excitation winding, a stationary armature, and a plunger disposed in cooperative arrangement such that a select partial energization of the winding operates to urge the plunger to displace laterally with respect to the winding and armature thereby stopping the plunger from further axial translation regardless of the plunger position and whereby full energization of the winding operates to urge the plunger to translate into the winding toward the armature.

11 Claims, 8 Drawing Figures

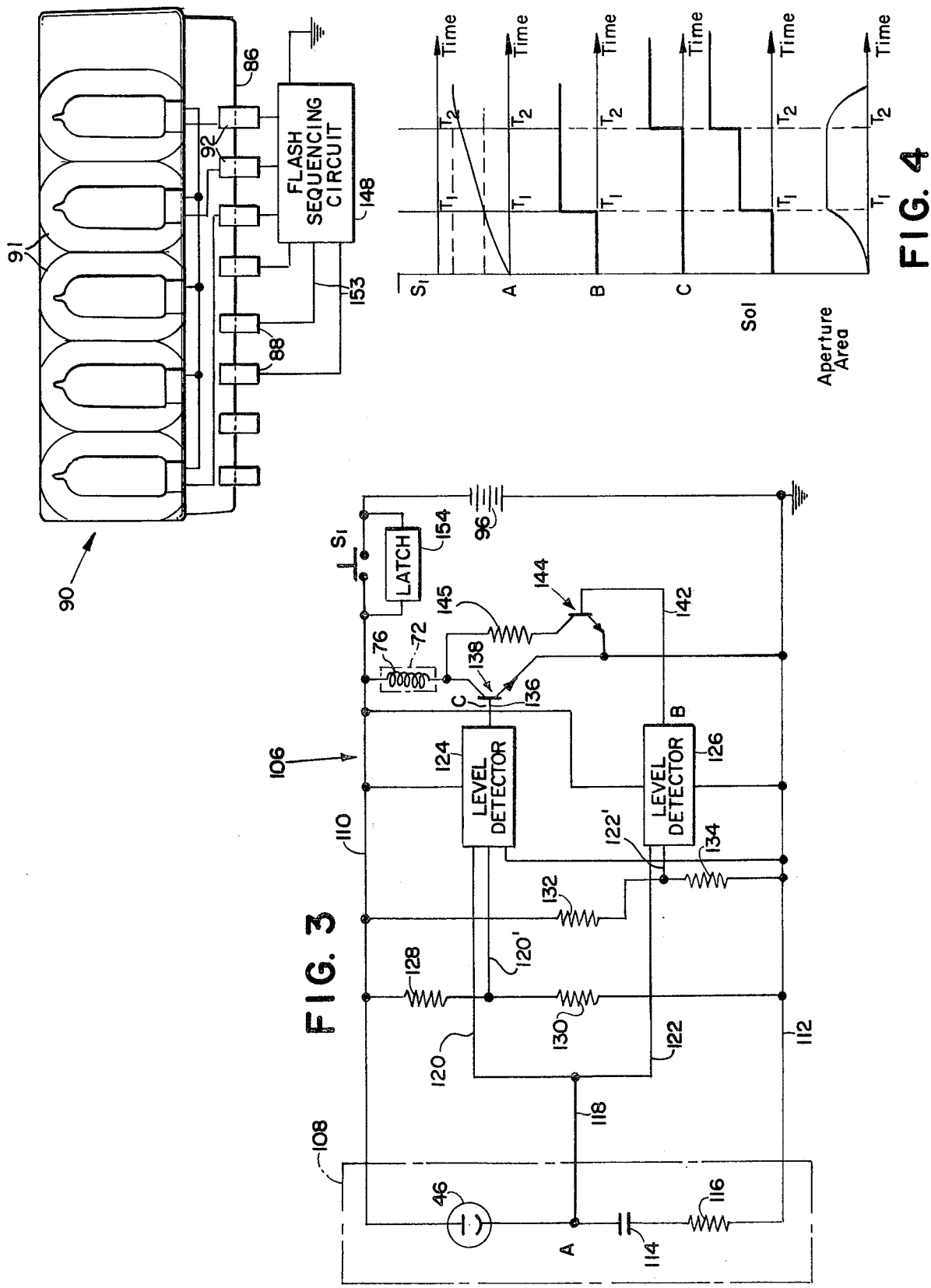

SOLENOID WITH SELECTIVELY ARRESTIBLE PLUNGER MOVEMENT

BACKGROUND OF THE INVENTION

1. Field of the Invention

This invention relates generally to a solenoid with a selectively arrestible plunger movement, and more particularly, to a solenoid which may be energized in a select manner to arrest its plunger movement wherein the solenoid is particularly suitable for use with "scanning type" shutter blade elements so that means responsive to scene light can be utilized to energize the solenoid in the select manner to arrest the plunger and shutter blade movement thereby determining a maximum effective aperture size.

2. Description of the Prior Art

Automatic light responsive exposure control systems are well known in the photographic arts and have been long used to control the duration of photographic exposure intervals. Such systems may also be used in conjunction with an aperture defining mechanism so as to halt the mechanism at a position appropriate for operation under a desired exposure program prior to the actual exposure interval as is more fully described in a U.S. Pat. No. 3,641,891 entitled "Exposure Control System" by John Burgarella issued Feb. 15, 1972, and assigned in common herewith. The exposure control system of Burgarella provides for automatic sequential regulation, first of exposure aperture, and then of exposure interval. Voltage sensitive triggering circuits coupled to receive the output of a light sensitive circuit are used for controlling first the aperture mechanism, and then the shutter mechanism to provide a predetermined exposure program. Such an exposure control system may also be made sensitive to both ambient illumination and illumination derived artifically, thereby being useable in a "fill-in" flash function.

Exposure control systems have also incorporated what is termed a "follow-focus" system where the aperture adjusting mechanism is mechanically coupled with the focusing system of the camera. Thus, as the lens focus system is moved to provide the correct focus for a particular distance from the camera to the subject, the coupling mechanism of the follow-focus control system also moves to provide an appropriate exposure aperture opening in response to the focusing action thereby setting the exposure aperture in accordance with the anticipated light level at the scene to be photographed. Because of the known characteristics of the flashlamp being used, the anticipated light level at the scene to be photographed is functionally related to the distance to the subject. The automatic exposure control system which is responsive to both scene light by way of an exposure control circuit and to subject distance by way of a follow-focus setting is described in U.S. Pat. No. 3,464,332 issued to Davidson et al on Sept. 2, 1969. In the exposure control system of this patent, the aperture opening for admitting light to the film plane is automatically selected in accordance with the focusing of the camera and the exposure time is then controlled by a light detecting and integrating circuit so as to establish a unique interrelationship between the exposure aperture and exposure time.

Another exposure control system, as fully described in U.S. Pat. No. 3,522,763 entitled "Exposure Control Apparatus" by Milton Dietz, issued Aug. 4, 1970, and assigned in common herewith, automatically regulates the exposure interval when used in the flashmode of operation in accordance with either of two functions, the one being the level of illumination of the subject as photoelectrically sensed, and the other being the distance between the subject and the source of illumination. Thus the shutter automatically responds to both functions terminating exposure in accordance with one or the other, whichever is first to control the shutter. That portion of the exposure control circuit utilized to control the shutter as a function of the distance between the subject and the source of illumination embodies a timing circuit comprising a capacitor and variable resistor in cooperative association with the focusing means so that focus adjustment for subjects at a relatively great distance from the camera provides for a relatively high resistance, whereas focus adjustment for a subject relatively close to the camera position provides a relatively low resistance. Such a system is somewhat analogous to the above-described "follow-focus" system in that exposure interval is electronically controlled as a function of camera to subject distance, whereas in the "follow focus" system aperture size is mechanically controlled as a function of camera to subject distance. Not only may exposure interval be electronically controlled in the above-described manner by means of a variable resistor in cooperative association with the focusing means, but also exposure aperture may be automatically determined as a function of camera to subject distance by means of a variable resistor in cooperative association with focusing means as more fully described in U.S. Pat. No. 3,611,895 entitled "Photographic Camera For Use In Daylight and Artificial Light" issued Oct. 12, 1971. This patent discloses a photographic camera wherein the aperture size is determined both as a function of scene brightness and of the position of the focusing means when the exposure is made in artificial light.

All of the above-described exposure control systems, however, have one thing in common which is that they are designed for use with exposure apparatus having distinct mechanisms for determining exposure aperture and exposure interval, so that the aperture is determined prior to the actual commencement of the exposure interval. However, most recently, so-called "scanning type" shutter blade mechanisms have been found to be most advantageous. "Scanning type" shutter blade mechanisms generally embody two shutter blade elements formed with respective selectively shaped aperture openings therethrough which, depending upon the position of the blades, symmetrically overlap over a light entering exposure opening within the camera to define an effective scene light admitting aperture. Such blades, during an exposure interval, will move simultaneously and in correspondence with each other to define a symmetrically configured and progressively variable effective aperture opening over the camera light entering opening. Such "scanning type" shutter blade systems have been utilized in conjunction with automatic exposure control systems to automatically terminate exposure interval as well as with "follow focus" systems of the above-described type. Such shutter blade mechanisms have also included a driving solenoid which may be energized at a select current level to control the rate at which the shutter blade elements move thereby defining the rate of change of the effective scene light admitting aperture as is more fully described in a copending application for U.S. patent Ser. No. 350,025 by C. Peterson filed Apr. 11, 1973, in common assignment herewith. However, even these exposure control arrangements may not provide the requisite flexibility to achieve a particular exposure program. Increased exposure program flexibility may be provided by an automatic exposure control system utilized in conjunction with "scanning type" shutter blade elements wherein the maximum effective aperture to which the shutter blade elements progress during an exposure interval is controlled as an inverse function of scene brightness. Difficulty, however, arises in providing a solenoid suitable for first arresting the progress of the shutter blade elements to define the maximum effective aperture and thereafter driving the shutter blade elements to the closed position.

Therefore, it is also an object of this invention to provide a solenoid suitable for use in conjunction with "scanning type" shutter blade elements wherein the maximum effective aperture to which the shutter blade elements progress during an exposure interval is determined in accordance with a first select energization condition of the solenoid after which the shutter blade elements are returned to their closed position by the solenoid to terminate the exposure interval in accordance with a second select energization condition of the solenoid.

It is a further object of this invention to provide a solenoid for use in conjunction with "scanning type" shutter blade elements wherein the progressive movement of the shutter blade elements may be selectively arrested by the solenoid in accordance with a select energization condition of the solenoid.

It is an even further object of this invention to provide a solenoid for use in conjunction with "scanning type" shutter blade elements wherein the maximum effective aperture to which the shutter blade elements are allowed to progress by the solenoid is programmed inversely to scene brightness so that high levels of scene light intensity result in relatively small effective apertures while low levels of scene light intensity result in substantially smaller effective apertures.

Other objects of the invention will in part be obvious and will in part appear hereinafter.

SUMMARY OF THE INVENTION

This invention relates to a solenoid comprising an excitation winding through which an axis may be defined. A stationary armature is concentrically disposed with respect to the winding axis and forms part of a flux path wherein one end of the armature is configured to define a first guide surface concentric with respect to the winding axis. A plunger is disposed within the winding for limited axial translation along the winding axis and includes an end face configured to define a second guide surface in cooperative association with respect to the first guide surface thereby accommodating axial translation of the second guide surface along the winding axis while at the same time permitting limited radial displacment of the second guide surface and its associated plunger end face with respect to the winding axis. The radial displacement is ultimately limited by lateral engagement between the first and second guide members. Means are also provided for establishing the continuity of the flux path about the winding. Lastly, the solenoid includes guide means in slidable engagement with respect to the plunger at a location spaced apart from the plunger end face and second guide surface for restricting radial displacement of the plunger with respect to the winding axis while at the same time accommodating axial translation of the plunger along the winding axis in a manner whereby a select partial energization of the winding operates to urge the second guide member to radially displace into lateral engagement with respect to the first guide member to stop the axial translation of the plunger regardless of the plunger position. Full energization of the winding operates to urge the the plunger end face to translate toward the armature end face to retract the plunger.

BRIEF DESCRIPTION OF THE DRAWINGS

The novel features that are considered characteristic of the invention are set forth with particularity in the appended claims. The invention, itself, however, both as to its organization and its method of operation, together with other objects and advantages thereof will be best understood from the following description of the illustrated embodiment or when read in connection with the accompanying drawings or when like members have been employed in the different figures to note the same parts and wherein:

FIG. 3 is a schematic diagram for an exposure control circuit embodying the solenoid of this invention;

FIG. 4 is a graphical representation of various signal levels at various points in the circuit of FIG. 3;

DESCRIPTION OF THE PREFERRED EMBODIMENT

Figure 1:
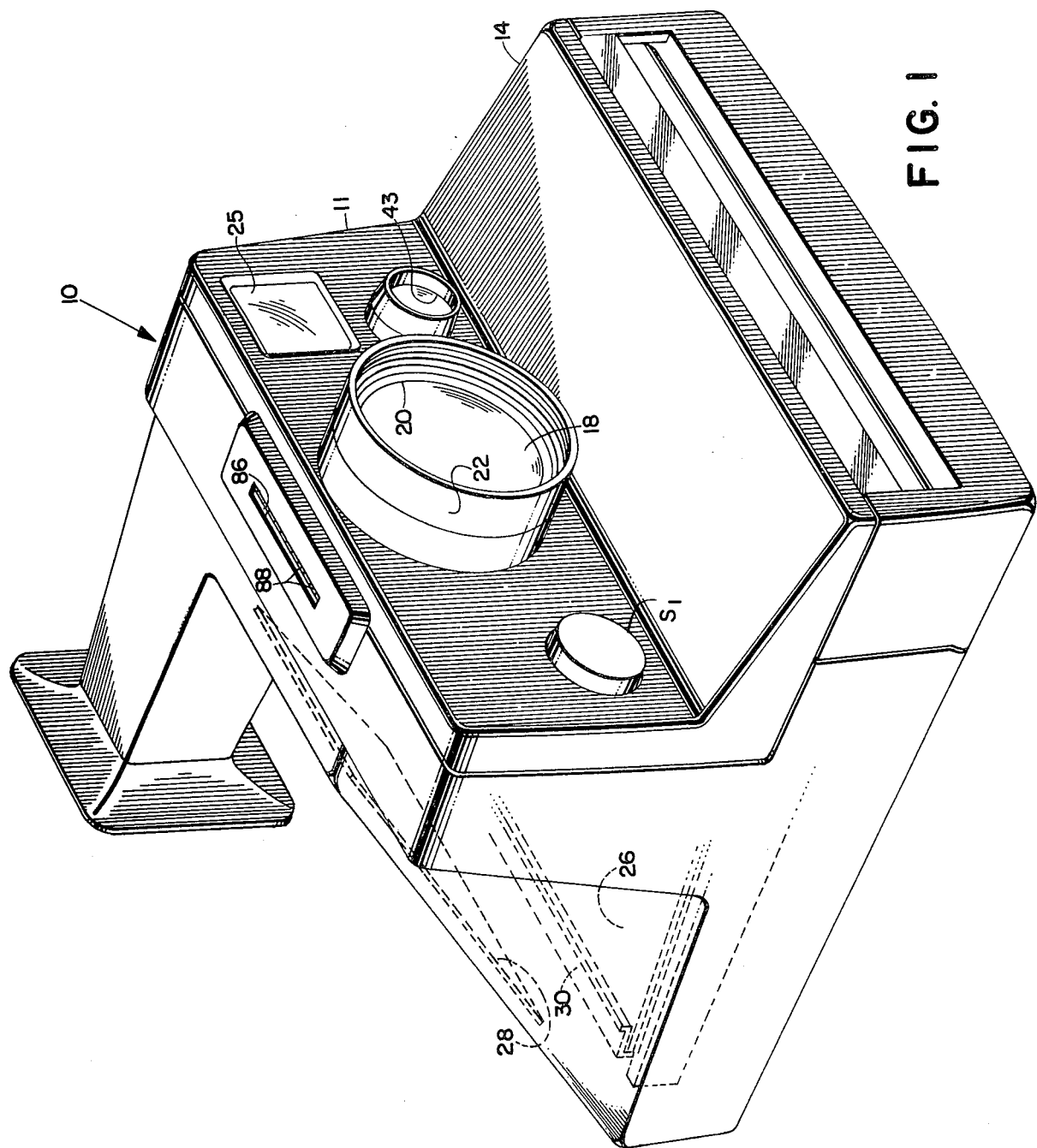
FIG. 1 is a perspective view of a photographic apparatus embodying the exposure control system of this invention.
Figure 2:
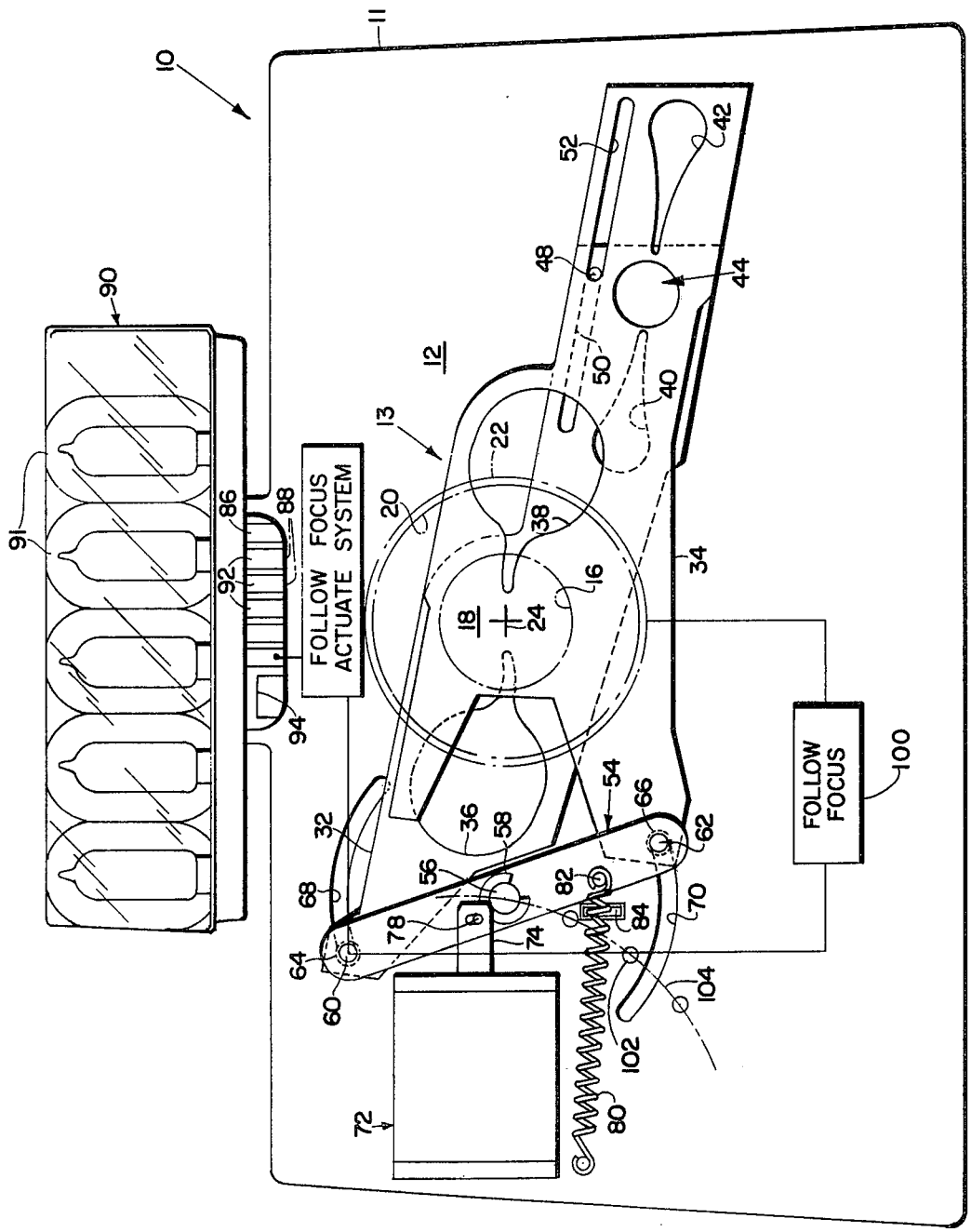
FIG. 2 is a front cutaway view of the exposure control mechanism of the photographic apparatus of FIG. 1.

Referring now to FIGS. 1 and 2, there is shown an exposure control system associated with a photographic camera apparatus 10 contained within a housing 11. A baseblock casting 12 is fixedly stationed within the housing 11 and selectively machined to support the various components of an exposure mechanism shown generally at 13. Surrounding the front and top of the baseblock casting 12, there is provided a cover section 14 which includes at least one opening through which extends a manually adjustable focus bezel 22. Centrally disposed within the baseblock casting 12, there is provided a light entering exposure opening 16 which defines the maximum available exposure aperture for the system.

An objective or taking lens 18 is provided in overlying relation to the light entering opening 16 wherein the objective lens 18 may comprise a plurality of elements retained in predetermined spaced relation by a cylindrical lens mount 20 which is externally threaded for toothed engagement within the internally threaded focus bezel 22. As is readily apparent, focus bezel 22 is made rotatable with respect to the front cover 14 to provide translational movement of the elements of lens 18 along the center axis 24 of the optical path of the housing 11. As is readily apparent, the central optical axis 24 is illustrated in FIG. 2 as being normal to the plane of the drawing. Thus, rotation of the focus bezel 22 may be carried out by manual rotation to provide displacement of the elements of objective lens 18 for focusing of image carrying rays through the light entering exposure opening 16 to a rearwardly positioned film plane 26 by way of a reflecting mirror 28 all of which are stationed within a suitable light tight film exposure chamber 30 within the housing 11.

Intermediate the objective lens 18 and light entering exposure opening 16, there are supported two overlapping shutter blade elements 32 and 34 of the so-called "scanning type" which will be subsequently described in greater detail herein. Extending from the front cover 14 there is provided a photographic cycle initiating button $S_1$, the depression of which commences the exposure interval by effecting the release of the shutter blade elements 32 and 34. In addition, there is provided a viewfinder shown generally at 25 which enables a photographer to properly frame the desired scene to be photographed.

A pair of scene light admitting primary apertures 36 and 38 are provided respectively in the blade elements 32 and 34 to collectively define a progressive variation of effective aperture openings in accordance with simultaneous longitudinal and lateral displacement of one blade element with respect to the other blade element in a manner as is fully described in a U.S. patent application Ser. No. 585,128 entitled "Camera With Pivoting Blades" by George D. Whiteside, filed July 2, 1974, and assigned in common herewith. The apertures 36 and 38 are selectively shaped so as to overlap the light entering exposure opening 16 thereby defining a gradually varying effective aperture size as a function of the position of the blade elements 32 and 34.

Each of the blades, 32 and 34, may additionally be configured to have corresponding photocell sweep secondary apertures shown respectively at 40 and 42. Secondary apertures 40 and 42 may be configured in correspondence with the shapes of scene light admitting primary apertures 32 and 34. As is readily apparent, the secondary apertures 40 and 42 also move in correspondence with the primary apertures 36 and 38 to define a small secondary effective aperture for admitting the passage of scene light transmitted through a second opening 43 in the cover 14 from the scene being photographed. Scene light admitted by the photocell secondary apertures 40 and 42 is thereafter directed to a light detecting station shown generally at 44. The light detecting station includes a photoresponsive element 46 which cooperates with light integrating and control circuitry (to be described) to terminate an exposure interval as a function of the amount of light received through the secondary effective aperture defined by the overlapping photocell sweep apertures 40 and 42.

Projecting from the baseblock casting 12 at a location spaced laterally apart from the light entering exposure opening 16, is a pivot pin or stud 48 which pivotally and translatively engages elongate slots 50 and 52 formed in respective shutter blade elements 32 and 34. Pin 48 may be integrally formed with the baseblock casting 12 and blade elements 32 and 34 may be retained in engaging relation with respect to the pin 48 by any suitable means such as peening over the outside end of pin 48.

The opposite ends of the blade elements 32 and 34 respectively include extended portions which pivotally connect to a walking beam 54. Beam 54, in turn, is disposed for rotation relative to the baseblock casting 12 by pivotal connection to a projecting pivot pin or stud 56 which may be integrally formed with the baseblock casting 12 at a location spaced laterally apart from the light entering exposure opening 16. The walking beam 54 may be pivotally retained with respect to the pin 56 by conventional means such as an E ring 58. In the preferred mode, the walking beam 54 is pivotally connected at its distal ends to the shutter blade elements 32 and 34 by respective pin members 60 and 62 which extend laterally outward from the walking beam 54. Pin members 60 and 62 are preferably circular in cross section and extend through respective circular openings 64 and 66 in respective blade elements 32 and 34 so as to slidably engage respective arcuate slots or tracks 68 and 70 which may be integrally formed within the baseblock casting 12. The arcuate tracks 68 and 70 operate to inhibit disengagement of the blade elements 32 and 34 from their respective pin members 60 and 62 during operation of the exposure control system.

The solenoid of this invention is shown generally at 72 and may be employed to displace the shutter blades 32 and 34 with respect to each other and the casting 12. Solenoid 72 includes an internally disposed cylindrical plunger unit 74 which retracts inwardly into the body of the solenoid upon energization of a solenoid winding 76. The solenoid plunger 74 may be affixed to the walking beam 54 by means of a pivot pin or stud 78 such that longitudinal displacement of the plunger 74 will operate to rotate the walking beam around the pivot pin 56 so as to appropriately displace the shutter blades 32 and 34.

The baseblock casting 12 supports the solenoid 72 in a position above a biasing tension spring 80 which operates to continuously urge the blade elements 32 and 34 into positions defining their largest effective aperture over the light entry exposure opening 16. The movable end of spring 80 is attached to walking beam 54 by a pin 82, while the stationary end of spring 80 is grounded with respect to the baseblock casting 12. Thus, with the spring connection herein described, the exposure control system of this invention is biased to continuously urge the shutter blade elements 32 and 34 into an open orientation.

In the present arrangement, the shutter blades 32 and 34 are drawn from their open position to their closed position as shown in FIG. 2 when the solenoid 72 is energized. Consequently, energization of solenoid 72 prevents the shutter blades 32, 34 from moving towards their maximum aperture opening under the urging of spring 80. However, as should be readily understood, the solenoid of this invention would be equally applicable for use with photographic systems where the blades 32 and 34 are spring biased in a normally closed position.

Continued energization of the solenoid 72 in order to maintain the shutter blade elements 32 and 34 in their closed positions may result in an undesirable drain in the camera apparatus power source which preferably is an electrical storage battery schematically shown at FIG. 3 at 96. Thus a mechanical latch as shown generally at 84 may be provided to move into lateral engagement with an edge of the walking beam 54 so as to maintain the blade elements 32 and 34 in their closed position regardless of the energization of solenoid 72. Additional information regarding the structure and operation of the latch 84 is described in an application for U.S. patent, Ser. No. 554,777 entitled "Photograhic Apparatus With Sequencing System" by B. K. Johnson, D. Van Allen and George D. Whiteside, filed Mar. 3, 1975 in common assignment herewith.

The photographic camera apparatus 10 may be utilized in conjunction with a source of artificial illumination which preferably comprises a linear array of flash lamps as shown generally at 90. The linear flash array includes a plurality of individually spaced apart flashlamps 91 which respectively connect to a plurality of spaced apart terminal pads or elements 92. The linear flash array 90 may be releasably connected with respect to the camera housing 11 by way of a receiving socket 86 which also includes a plurality of spaced apart terminal pads or elements 88. The linear flash array 90 may be inserted and withdrawn from the receiving socket 86 in a manner as is fully described in U.S. Pat. No. 3,757,643 entitled "Photo-flash Apparatus" by John Burgarella issued Sept. 11, 1973 and assigned in common herewith.

Under conditions of artificial illumination wherein the light has a relatively short duration, such as from the individual flashlamps 91 of the linear array 90, the anticipated light level at the camera will depend upon the known characteristics of the flashlamps 91 and upon the distance from the subject being photographed to the light source. When the flash array 90 is mounted on the receiving socket 86, there may be actuated a follow focus system whereby the maximum effective aperture to which the shutter blade elements 32, 34 are allowed to progress is determined in accordance with the distance from the taking lens 18 to the subject being photographed. Thus, as the focus bezel 22 is rotated to provide the correct focus for a particular distance from the photographic apparatus 10 to the subject, a follow focus mechanism (shown generally at 100) moves to appropriately displace a follow focus interceptor pin 102 about its locus of travel as shown by the phantom line 104. The follow focus interceptor pin 102 may be selectively actuated to intercept the edge of walking beam 54 in a well known manner as is more fully described in a U.S. patent application Ser. No. 554,777 entitled "Exposure Control System with Improved Follow Focus Capability For Photographic Apparatus", by George D. Whiteside, filed Feb. 28, 1975, and assigned in common herewith. Thus, as is readily apparent, the walking beam 54 may be intercepted by the follow focus interceptor pin 102 at various locations defining various maximum effective apertures which correspond to the distance from which the subject is spaced from the camera apparatus 10.

Turning now to FIG. 3, there is shown generally at 106 an exposure control circuit which may be utilized to control the solenoid of this invention. Control circuit 106 and various embodiments thereof are described and claimed in a copending application for United States patent (Our Case No. 5374) by E. Shenk and J. Muggli filed concurrently herewith in common assignment. Circuit 106 includes a light detecting and integrating circuit 108 comprising the photoresponsive element 46 in series connection with respect to a light integrating capacitor 114 and an anticipation resistor 116. The light detecting and integrating circuit 108 is energized by way of a power supply line 110 and a return ground line 112. The photoresponsive element 46 may be of the well known photoresistor type so as to cooperate with the light integrating capacitor 114 to provide an output signal at line 118 indicative of the time integration of the detected scene light.

The output signal from the light detecting and integrating circuit 108 at line 118 is thereafter directed to a pair of level detector circuits 124, 126 by way of interconnecting lines 120 and 122 respectively. Each level detector 124 and 126 may be of any conventional design such as a Schmidt trigger. As is readily apparent, the steady state input reference voltage to the level detector 124 is established by biasing means comprising a first resistor 128 connected between the supply line 110 and the input line 120' together with a second resistor 130 connected between the input line 120' and the ground line 112. In like manner, the steady-state input reference voltage level to the detector 126 is established by biasing means comprising a third resistor 132 connected between the supply line 110 and the input line 122' together with a fourth resistor 134 connected between the input line 122' and the ground line 112. The output signal from the detector 124 is directed to the base of an NPN transistor 138 by way of an interconnecting line 136. The collector of transistor 138, in turn, is connected to the supply line 110 by way of the solenoid winding 76, while the emitter of transistor 138 is connected to the ground line 112. In like manner, the output signal from the level detector 126 is directed to the base of an NPN transistor 144 by way of an interconnecting line 142. The collector of transistor 144, in turn, is connected to the supply line 110 by way of an interconnecting resistor 145, and the solenoid winding 76 while the emitter of transistor 144 is in common connection with the emitter of transistor 138 and the ground line 112.

A photographic exposure cycle may be commenced in ordinary ambient light upon the depression of the exposure cycle initiating button $S_1$. As will become readily apparent, the operational sequence for the various embodiments of the exposure control system for this invention are described in relation to a photograhic camera of the non-single lens reflex type, although the intended scope of the invention is by no means so limited and cameras of the well-known reflex type as described in U.S. Pat. No. 3,672,281 entitled "Reflex Camera" by E. H. Land may be equally suitable for embodying the solenoid of this invention. Closure of the switch $S_1$ operates to simultaneously move the latch 84 out of engagement with the edge of the walking beam 54 in a manner fully described in U.S. patent application Ser. No. 554,777 supra., as well as energize the exposure control circuit 106. Disengagement of the latch 84 from the edge of the walking beam 54 permits the tension spring 80 to rotate the walking beam 54 in a clockwise direction as viewed in FIG. 2. In this manner, the shutter blade elements 32 and 34 are moved in directions which operate to progressively enlarge the effective aperture over the light entering exposure opening 16 as graphically shown by the aperture area vs. time curve of FIG. 4. Rotation of the walking beam 54 effects simultaneous linear and angular movement of the shutter blade elements 32 and 34 about pivot pin 48 so that photocell sweep secondary apertures 40 and 42 simultaneously define a corresponding progressively enlarging aperture opening over the photoresponsive element 46.

As is readily apparent, the battery supply voltage across lines 110, 112 will be maintained only as long as the operator maintains switch $S_1$ in its depressed state which may be perfectly adequate for situations where the human reaction time in depressing and releasing the switch $S_1$ substantially exceeds the longest exposure time likely to be incurred. However, in situations where the normal exposure time is likely to exceed the human reaction time in depressing and releasing switch $S_1$, there may be provided a latch circuit 154 in parallel connection with respect to the switch $S_1$ for maintaining continuous energization of the circuit 106 even after the release of the switch $S_1$. A suitable automatic latch circuit is more fully described in U.S. Pat. No. 3,744,385 entitled "Control System For Photographic Apparatus" by Burgarella et. al. issued July 10, 1973 and assigned in common herewith.

From the instant the photographic exposure cycle is initiated by the depression of the switch $S_1$, the photoresponsive element 46 provides a time varying resistance output response corresponding to the intensity of scene light incident thereon. The capacitor 114 operates in conjunction with the photoresponsive element 46 to provide an output signal A which is representative of the time integration of the scene light intensity incident to the photoresponsive element 46, as best seen by the curve A vs. time in FIG. 4.

The input voltage level A to the detector circuit 126 is initially below the reference level established by the resistors 132 and 134 and thereafter increases toward the reference level to trigger the level detector 126. When the level detector 126 is triggered, the output signal therefrom at line 142 abruptly changes from a generally low value which is insufficient to maintain the transistor 144 in conduction, to a substantially higher current level of sufficient value to turn on the transistor 144 and thus establish a current flow from collector to emitter through the transistor 144. After the initiation of the photographic exposure cycle, the voltage level at line 122 gradually increases as a result of the time integration of the scene light incident to the photoresponsive element 46, until reaching the predetermined value required to trigger the level detector circuit 126, thereby abruptly changing the output response at line 142 to turn on transistor 144. Turning on transistor 144 results in a current flow through the collector emitter junctions thereof as well as through the resistor 145, so as to partially energize the solenoid winding 76 and generate a magnetic force opposing the opening spring force. In this manner, outward movement of the solenoid plunger 74 is effectively slowed down and stopped as will be more fully described in the following discussion. Braking the solenoid 72 in this manner so as to stop the movement of the plunger 74 also operates to simultaneously stop the movement of the shutter blade elements 32 and 34 in a position defining a select maximum effective aperture over the light entering exposure opening 16. Thus, the shutter blade elements 32 and 34 may be halted during the actual exposure interval to define a maximum effective aperture which is programmed inversely with scene brightness. High levels of scene light intensity therefore would result in relatively small maximum effective apertures while, conversely, low levels of scene light intensity result in relatively large maximum effective apertures.

The steady-state reference voltage level to the level detector 124 is biased by the resistors 128 and 130 to be above the predetermined value required to trigger the level detector 126. In like manner, triggering the level detector 126 results in an abrupt change in the output current level at line 136 from a generally low value of an insufficient value to turn on the transistor 138, to a substantially higher voltage level of sufficient value to turn on the transistor 138 at time $T_2$ as best seen in FIG. 4 by the curve c vs. time. Thus, after the solenoid winding 76 is energized to brake the plunger 74 and arrest the movement of shutter blade elements 32 and 34 at time $T_1$, the light detecting and integrating circuit 108 continues to provide an output signal at line 118 representative of the time integration of the scene light intensity incident to the photoresponsive element 46. The voltage level at line 120 progressively increases as a result of the time integration of the scene light incident to the photoresponsive element 46 until it reaches the predetermined value required to trigger the level detector 124, thereby turning on the transistor 138 so as to fully energize the solenoid winding 76 and cause the solenoid plunger 74 to retract thereinto at time $T_2$. Retraction of the solenoid plunger 74, in turn, operates to rotate the walking beam 54 in a counterclockwise direction as viewed from FIG. 2 against the biasing force of tension spring 80 so as to move the shutter blade elements into their light blocking closed position. After the walking beam 54 is rotated to its full counterclockwise position, the latch 84 may be automatically moved into intercepting relation with the edge of the walking beam so as to permit the de-energization of the solenoid in a manner as is more fully described in U.S. patent application Ser. No. 554,777, supra.

Referring now to FIG. 4, it can be readily appreciated that an exposure program may be selected for use in conjunction with the two-bladed "scanning type" exposure mechanism herein described that will provide satisfactory exposures under a wide variety of scene lighting conditions. This is made possible by the fact that not only may the exposure interval be terminated as a function of scene brightness, but also the maximum effective aperture to which the shutter blade elements are allowed to progressively increase may also be determined as a function of scene light intensity.

Under conditions of low ambient light intensity, it may be necessary in order to provide an adequate film exposure to insert the linear flash array 90 into the flash array receiving socket 86 in a manner causing respective electrical contact between terminal pads or elements 92 and 88. Insertion of the linear flash array 90 within the flash array receiving socket 86 may also operate to actuate the follow focus mechanism 100 so as to move the interceptor pin 102 into the walking beam 54 locus of travel. As previously discussed, the rotation of the focus bezel 22 to focus the objective lens 18 also operates to move the interceptor pin 102 along the phantom line 104. Thus, the maximum effective aperture to which the shutter blade elements 32, 34 may be progressively opened would be limited by the point of interception of the pin 102 with the edge of the walking beam 54.

Figure 5:
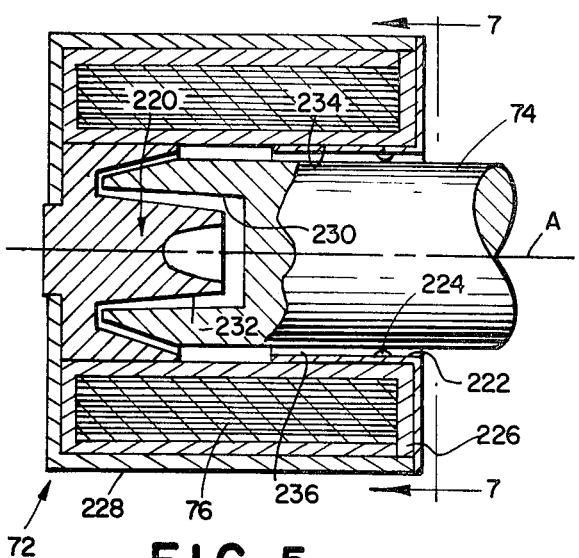
FIG. 5 is a cross-sectional side view of a portion of the solenoid of this invention.
Figure 7:
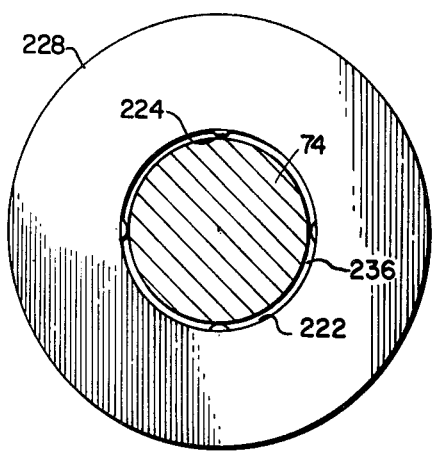
FIG. 7 is a cross-sectional view taken across the lines 7—7 of FIG. 5.
Figure 6:
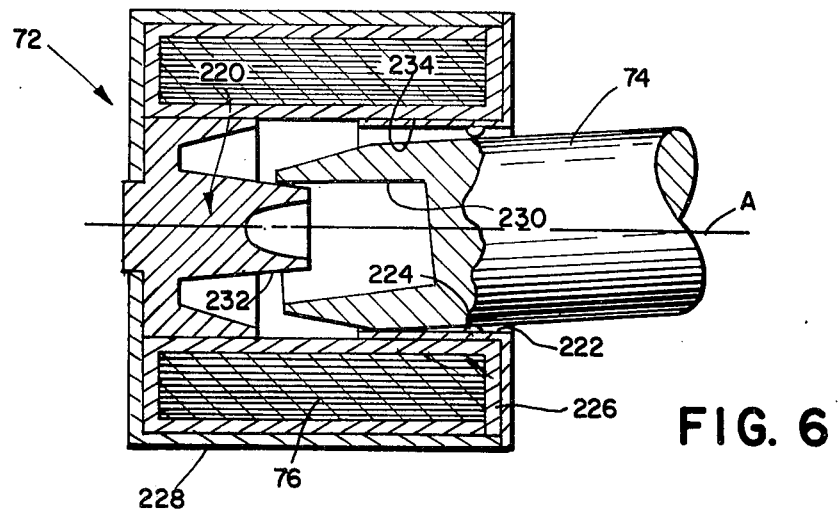
FIG. 6 is a cross-sectional side view of a portion of the solenoid of FIG. 5 in a different operative mode.

Referring now to FIGS. 5–7, there is shown in substantial detail the solenoid 72 of this invention which is particularly suited for arresting motion of the shutter blade elements 32 and 34 upon a partial energization of the solenoid winding 76. The excitation winding 76 is spirally wound about an elongated insulator supporting bobbin 226 which in turn is positioned within a U-shaped frame 228 for fixed connection with respect to the baseblock casting 12. Plunger 74 is cylindrically shaped and disposed in general concentric relation with respect to an axis A symmetrically disposed within the internal hollow core 234 of the elongated winding 76. There is also provided a stationary armature or plug 220 centrally disposed within the internal hollow core 234 of bobbin 226. The inside end face of armature 220 defines a conical frustum surface 232 which extends loosely into a cylindrical recess 230 in the inside end face of plunger 74 in order to guide the plunger 74 in a manner which will become more apparent from the following discussion.

A cylindrically shaped ferro-magnetic flux tub 222 is stationed in fixed concentric relation with respect to the bobbin 226 and in circumferentially spaced apart relation with respect to the plunger 74 so as to define an annular air gap 236 between the plunger 74 and tube 222. The end of the plunger 74 is supported in spaced apart relation with respect to the magnetic flux tube 222 by the cooperative guiding arrangement between the conical frustrum 232 and the recess 230. Closely adjacent the outside end of the tube 222, there are provided a plurality of circumferentially spaced apart projections or nipples 224 which extend radially inward from the tube 222 into slidable engaging relation with respect to the plunger 74 so as to establish a fulcrum upon which the plunger may be selectively pivoted in the following manner.

Solenoid 72 is designed to have a force-stroke characteristic for matching operation in conjunction with the associated spring force of biasing tension spring 80. Accordingly, when the solenoid 72 is in the unenergized state, the bias exerted by tension spring 80 operates to progressively move the shutter blade elements 32, 34 in the direction of ever-increasing aperture. However, when excitation winding 76 is partially energized in the aforementioned manner, the conical frustum 232 of armature 220 defines a magnetic flux condition which saturates that portion of the plunger recess 230 closest thereto so as to pull the plunger 74 against the armature 220 during the braking mode of operation. In this manner, the plunger 74 is pivoted about the fulcrum defined by the nipples 224 so as to assume the eccentric position as shown in FIG. 6, and thereby provide a frictional holding force during braking. As is readily apparent, the tube 222 and nipples 224 operate to guide the plunger 74 through axial translation while also accommodating lateral displacement of the inside end face of the plunger 74.

When the control circuitry determines that a proper exposure has been made in the above-described manner, winding 76 of solenoid 72 is fully energized to overcome the frictional holding force and thereby cause the retraction of plunger 74 into the seated position as shown in FIG. 5. During plunger retraction, the stationary armature 220 cooperates with the recess 230 to guide the plunger 74 into a generally concentric position with respect to the axis A. However, as will be readily appreciated, the major diametral extend of the conical frustum 232 is preferably slightly less than the diameter of the recess 230 so as to only loosely fit therein upon full plunger retraction. Whereas the recess 230 is illustrated as being cylindrical in shape, it should be readily appreciated that the recess may also define a frusto-conical interior surface complementary to the stationary armature frustum 232.

Figure 8:
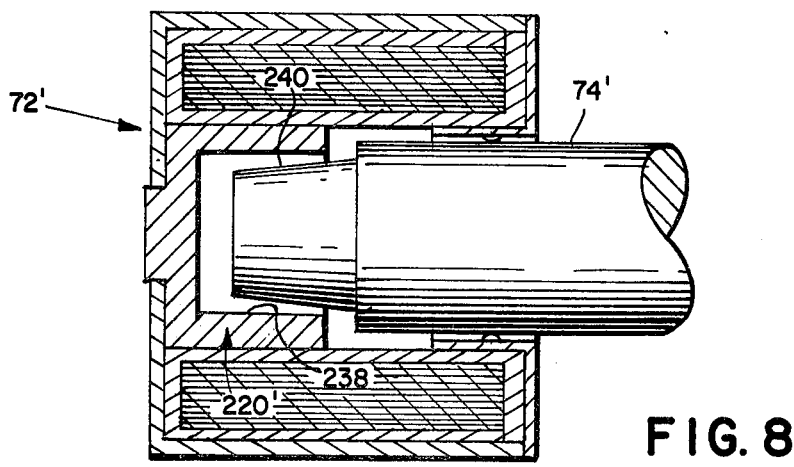
FIG. 8 is a cross-sectional view of a portion of an alternate embodiment for the solenoid of FIG. 5.

Referring now to FIG. 8, there is shown an alternate arrangement at 72' for the solenoid of FIG. 5. The inside end face of the plunger 74' defines a projecting conical frustum 240 disposed for slidable engagement with respect to a cylindrical recess 238 in the armature 220'. Again the solenoid 72 is braked upon partial energization thereof by the magnetic flux saturation across the closest points between the conical frustum 240 and the cylindrical recess 238. Thus, the plunger 74' is also laterally displaced in the above-described manner to brake the forward momentum thereof and arrest the movement of the shutter blade elements 32 and 34.

Since certain changes may be made in the above-described embodiments without departing from the scope of the invention herein involved, it is intended that all matter contained in the above description or shown in the accompanying drawings shall be interpreted as illustrative and not in a limiting sense.

What is claimed is:

1. Solenoid apparatus comprising:
   an elongated excitation winding defining a longitudinal axis around which said excitation winding is disposed, along which said excitation winding extends, and with respect to which said excitation winding is radially spaced;
   means for cooperating with said excitation winding, when said excitation winding is energized, for establishing a substantially low reluctance flux path for the electromagnetic field of said excitation winding, said flux path establishing means including a stationary armature positioned adjacent one end of said excitation winding and extending intermediate portions of said excitation winding disposed on opposite sides of said longitudinal axis to define a first surface positioned within said excitation winding intermediate said excitation winding and said axis and an elongated plunger disposed generally along said axis and having an end portion extending between radially disposed portions of said excitation winding, said end portion of said plunger defining a second surface disposed in facing relationship with respect to said first surface of said armature, at least one of said surfaces constituting a guide surface extending generally lengthwise of said axis and against which said other surface is adapted to be slidably seated;
   means, spaced from said first surface lengthwise of said axis and extending radially inwardly from said excitation winding into contact with the longitudinal extending peripheral surface of said plunger, for establishing a fulcrum upon which said plunger, can pivot to selectively effect engagement between said first and second surfaces; and
   means for urging said plunger outwardly of said excitation winding in the direction away from its said one end, when said excitation winding is unenergized,
   said surfaces further being configured and arranged such that, when said excitation winding is energized at a first predetermined level, contact is effected between said guide surfaces under a force sufficient to establish frictional forces therebetween precluding further displacement of said plunger in either direction along said axis and, when said excitation winding is subsequently energized at a second predetermined level greater than said first predetermined level, the frictional forces thereby established between said first and second surfaces and the force exerted on said plunger by said plunger urging means are insufficient to preclude further displacement of said plunger inwardly of said excitation winding towards its said one end under the influence of said electromagnetic field.

2. The solenoid apparatus of claim 1 wherein at least one of said surfaces constituting a guide surface extending generally lengthwise of said axis is also canted with respect to said axis.

3. The solenoid of claim 1 wherein said second surface includes a recess in said plunger end portion and wherein said first guide surface includes a conical frustum in coaxial alignment with respect to said excitation winding axis, said frustum also penetrating said recess so that axial translation of said plunger out of said winding operates to progressively increase the maximum allowable radial displacement of said plunger recess with respect to said conical frustum.

4. The solenoid of claim 3 wherein said means for establishing a fulcrum include a plurality of circumferentially spaced apart projections extending radially inward from fixed connection with respect to said excitation winding into sliding engagement with respect to said plunger.

5. The solenoid of claim 4 wherein said means for establishing a fulcrum additionally include a ferro-magnetic tube stationed in concentric fixed relation with respect to said excitation winding axis, said tube also being stationed in concentric spaced apart relation with respect to said plunger and additionally connnecting to said circumferentially spaced apart projections which extend radially inward therefrom into sliding engagement with respect to said plunger.

6. The solenoid of claim 1 wherein said first surface includes a recess in said armature and wherein said second surface includes a conical frustum in general coaxial alignment with respect to said excitation winding axis, said frustum also penetrating said recess so that axial translation of said plunger out of said excitation winding operates to progressively increase the maximum allowable radial displacement of said plunger frustum with respect to said recess.

7. The solenoid of claim 6 wherein said means for establishing a plurality of circumferentially spaced apart projections extending radially inward from fixed connection with respect to said excitation winding into sliding engagement with respect to said plunger.

8. The solenoid of claim 7 wherein said means for establishing a fulcrum additionally include a ferro-magnetic tube stationed in concentric fixed relation with respect to said excitation winding axis, said tube also being stationed in concentric spaced apart relation with respect to said plunger and additionally connecting to said circumferentially spaced apart projections which extend radially inward therefrom into sliding engagement with respect to said plunger.

9. The solenoid of claim 1 wherein said means for establishing a fulcrum include a plurality of circumferentially spaced apart projections extending radially inward from fixed connection with respect to said winding into sliding engagement with respect to said plunger.

10. The solenoid of claim 9 wherein said means for establishing a fulcrum additionally include a ferro-magnetic tube stationed in concentric fixed relation with respect to said excitation winding axis, said tube also being stationed in concentric spaced apart relation with respect to said plunger and additionally connecting to said circumferentially spaced apart projections which extend radially inward therefrom into sliding engagement with respect to said plunger.

11. Solenoid apparatus comprising:
an elongated excitation winding defining a longitudinal axis around which said excitation winding is disposed, along which said excitation winding extends, and with respect to which said excitation winding is radially spaced;
means for cooperating with said excitation winding, when said excitation winding is energized, for establishing a substantially low reluctance flux path for the electromagnetic field of said excitation winding, said flux path establishing means including a stationary armature positioned adjacent one end of said excitation winding and extending intermediate portions of said excitation winding disposed on opposite sides of said longitudinal axis to define a first surface positioned within said excitation winding intermediate said excitation winding and said axis and an elongated plunger disposed generally along said axis and having an end portion extending between radially disposed portions of said excitation winding, said end portion of said plunger defining a second surface disposed in facing spaced relationship with respect to said first surface of said armature, at least one of said surfaces constituting a guide surface extending generally lengthwise of said axis and against which said other surface is slidably seated when said excitation winding is partially energized; and
means, spaced from said first surface lengthwise of said axis and extending radially inwardly from said excitation winding into contact with the longitudinal extending peripheral surface of said plunger, for establishing a fulcrum upon which said plunger can pivot to selectively effect engagement between said first and second surfaces.

* * * * *